No. 622,415. Patented Apr. 4, 1899.
J. A. CALANTARIENTS.
RESILIENT TIRE FOR CYCLES.
(Application filed Dec. 28, 1897.)
(No Model.)
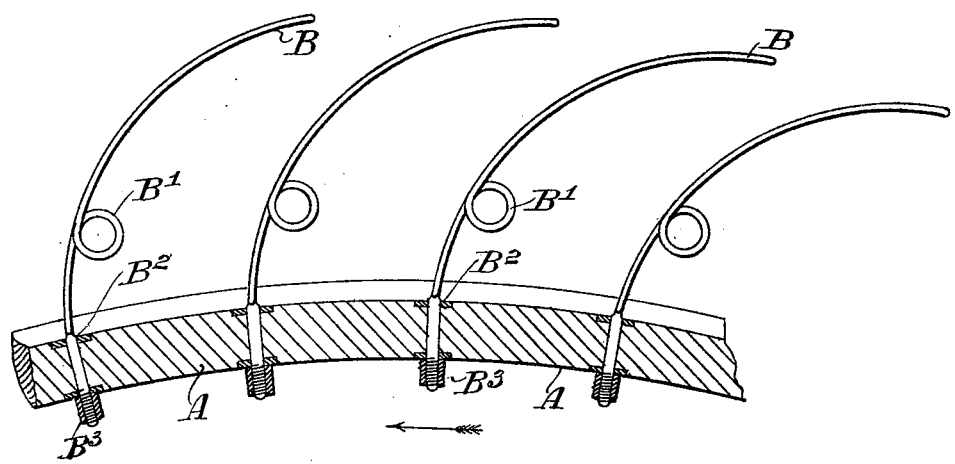
Fig: 1.
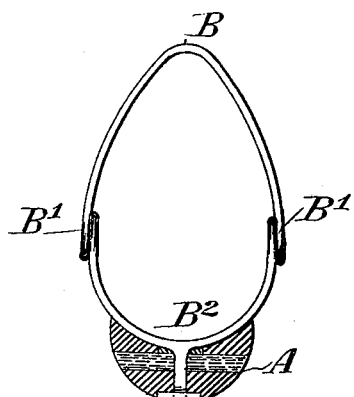
Fig: 2.
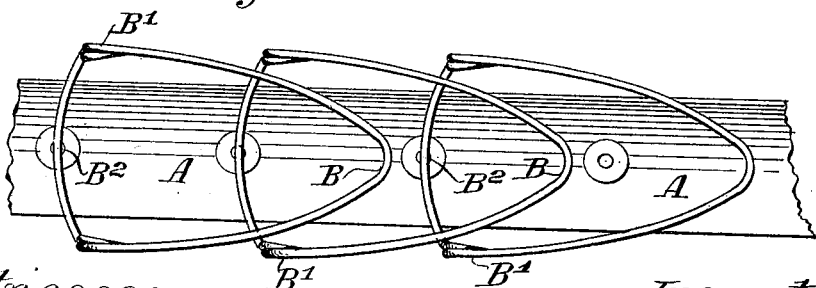
Fig: 3.
Witnesses:- Edward Vieser. George Barry Jr.
Inventor:- Johannes A. Calantariento by attorneys Brown & Seward

UNITED STATES PATENT OFFICE.

JOHANNES A. CALANTARIENTS, OF SCARBOROUGH, ENGLAND.

RESILIENT TIRE FOR CYCLES.

SPECIFICATION forming part of Letters Patent No. 622,415, dated April 4, 1899.

Application filed December 28, 1897. Serial No. 663,862. (No model.)

*To all whom it may concern:*

Be it known that I, JOHANNES AVETICIAN CALANTARIENTS, doctor of medicine, of 15 York Place, Scarborough, England, have invented an Improved Resilient Tire for Cycles, Carriages, and other Vehicles, of which the following is a specification, and for which I have obtained Letters Patent of Great Britain and Ireland, No. 19,758, dated September 7, 1896.

This invention relates to vehicle-wheels the treads, tires, or peripheries of which are composed of a number of curved springs arranged upon the rim or felly at short distances from and in line with each other, so as to form a practically continuous elastic tread; and it consists in the improved construction hereinafter described and claimed.

Figure 1 is a longitudinal sectional elevation of a part of a wheel-rim with a tire or tread composed of springs embodying my invention. Fig. 2 is a transverse sectional elevation of the same. Fig. 3 is a plan view.

The same letters refer to similar parts in all the drawings.

A is the rim; B, the springs fixed in the rim by their stems $B^2$.

$B'$ is a spiral on each side introduced in the course of the spring to give it additional resiliency. The direction of the stem $B^2$ is that of a radius from the center of the wheel to the circumference; but the spring above the stem forms a curve, as best seen at Fig. 1. The spring consists of a loop of round or angular steel wire shaped something like a lanceolate leaf, with both ends rounded. From the center of the broad end extends the stem $B^2$, which is of a square or angular shape, fitting into a similar-shaped socket in the rim, the end projecting beyond the rim being round and threaded to receive the nut at $B^3$ by which the spring is fixed to the rim. The springs are arranged at convenient distances from one another and transversely to the rim, as shown at Fig. 2, so that their extremities extend along the central line of the circumference of the rim. The object of the stem being made square is to prevent the slightest side movement of the spring.

An important advantage of my system of constructing a tire is that any spring that is worn out or damaged by accident can be removed and a fresh one substituted in a moment with the greatest ease. My tire therefore never becomes completely worn out and would continue in good working order as long as the rim holds out. Even when the rim is worn out or broken the springs may be removed and fixed on a fresh rim.

As to the rim, any kind will answer that is sufficiently strong and suitable for the purpose.

A cycle or other vehicle fitted with wheels having the above-described tire when in use would act in this manner: The weight of cycle and rider would cause the springs to bend against the ground, the outer extremities coming nearer and nearer toward the rim, according to the amount of weight, the part of each spring beyond the spiral finding free space for such movement between the limbs of the spring before it by reason of the lanceolate form, the loop increasing in width from the point backward.

I claim—

In a wheel for cycles and similar vehicles, a resilient periphery comprising a series of curved metallic loop-springs which are mounted separately on stems set radially and in line on the wheel-circumference and are of such lanceolate form that they overlap one another without coming into contact when under compression, substantially as described.

JOHANNES A. CALANTARIENTS.

Witnesses:
 ALBERT EDWIN HICK,
 A. SLEIGHTHOLM.